United States Patent [19]

Rhodes

[11] 4,398,332

[45] Aug. 16, 1983

[54] METHOD OF ASSEMBLING STACKABLE COMPONENTS

[75] Inventor: Eugene E. Rhodes, Belleville, Mich.

[73] Assignee: Ford Motor Company, Dearborn, Mich.

[21] Appl. No.: 219,026

[22] Filed: Dec. 22, 1980

[51] Int. Cl.³ .................................................. B23P 15/26
[52] U.S. Cl. .................................. 29/157.3 R; 165/148
[58] Field of Search .................... 228/190, 183, 180 R; 29/157.3 C, 727, 157.3 R, 157.3 A, 157.3 B, 157.3 D; 165/148, 149

[56] References Cited

U.S. PATENT DOCUMENTS 2,961,222 11/1960 Butt ........................................ 228/183

Primary Examiner—Lowell A. Larson
Assistant Examiner—V. K. Rising

Attorney, Agent, or Firm—William E. Johnson; Olin B. Johnson

[57] ABSTRACT

This specification teaches a method of assembling stackable components which is initiated by stacking a first stack forming member. This member has at least a pair of strap securing areas associated therewith on opposite sides thereof. A plurality of stack forming structures is stacked upon the first stack forming member and thereafter a last stack forming member is stacked upon the plurality of stack forming structures. The last stack forming member also has a pair of strap securing areas on opposite sides thereof. A pressure is applied to form the first and the last stack forming members and the stack forming structures stacked therebetween into an assembly. While the pressure is being applied, assembly holding straps are secured, as by stapling, on opposite sides of the assembly between the strap securing areas of the first and the last stack forming members.

2 Claims, 2 Drawing Figures

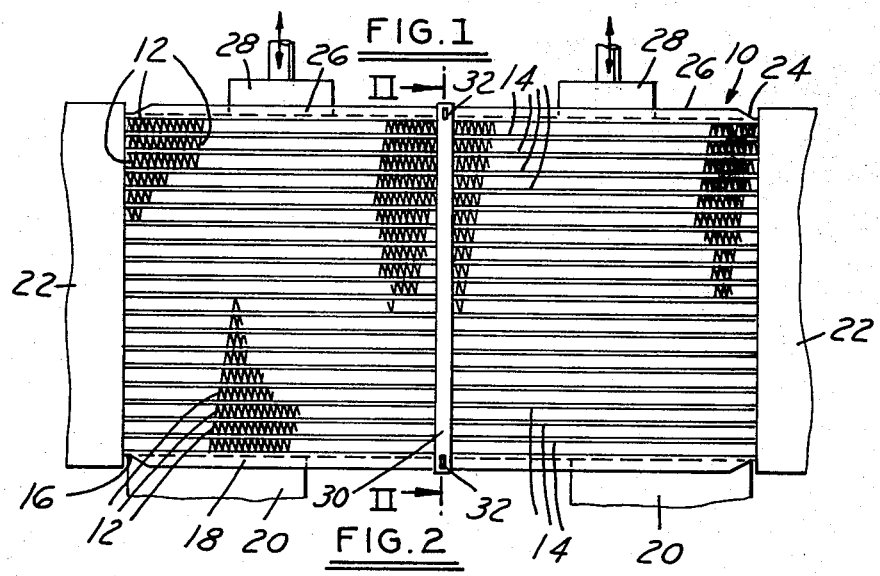
FIG. 1
FIG. 2
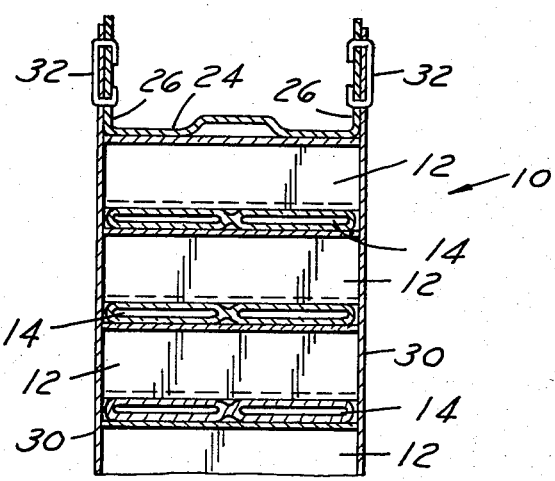
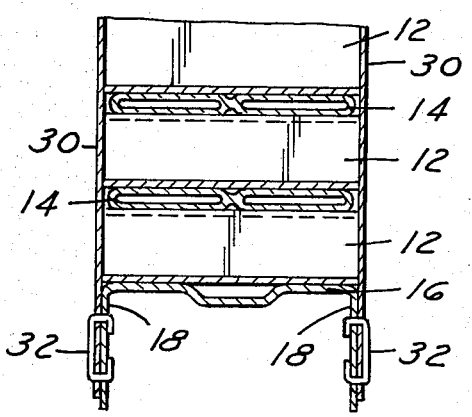

METHOD OF ASSEMBLING STACKABLE COMPONENTS

BACKGROUND OF THE INVENTION AND PRIOR ART STATEMENT

No search was conducted on the method disclosed in this specification in the U.S. Patent Office or in any search facility. I am unaware of any prior art which is any more relevant to the method disclosed in this specification that that which is described hereinbelow.

I have been working in the area of assembling a plurality of radiator forming structures in order to produce a radiator structure. Basically, the radiator forming structures are in the form of tubes which carry coolant and extremely thin, highly folded fin elements mounted between the tubes so that the heat of the coolant can be dissipated by means of the fin elements as the coolant flows through the tubes from an inlet side of the radiator to an outlet side of the radiator. In past practices, a number of tubes and fin elements are assembled, one over the other and then a U-bolt is placed around the structure so that the upstanding ends of the U-bolt extend beyond the stacked radiator forming structures. A plate having a pair of openings is dropped over the U-bolt with one opening receiving each leg of the bolt. Thereafter, self tapping nuts are applied to the individual legs of the U-bolt in order to firmly anchor the plate in place and hold the stacked radiator forming structures in position to form the final radiator structure.

This method is rather costly because of the requirement of using self tapping nuts on the free ends of the U-bolt. This is necessary because the exact height dimension of the finished radiator structure is a variable. In general, the structure is formed by applying a prescribed amount of pressure in order to get a required force between the various elements making up the structure so that a good contact is made therebetween. Because the finned elements can crush at different rates, normally there is a variance of from about 0.050 to about 0.250 inches between the various finished assemblies. Because of such a variance, the U-bolts cannot be made to a particular dimension and therefore self tapping nuts must be used in order to secure the plate to the U-bolts and retain the stacked radiator forming structures in a particular configuration.

It is a principal object of this invention to provide a method of assembling stackable components in a manner which is simple and efficient in operation, but which provides an assembled structure in which the structural forming elements are held securely in contact with one another after their assembly.

SUMMARY OF THE INVENTION

This invention relates to a method of assembling stackable components and more particularly to a method of assembling stackable components which provides that the stackable components are secured together into a finished structure with the minimum of effort.

In accordance with the teachings of the method of this invention, a first stack forming member is stacked. This first stacked forming member has at least a pair of strap securing areas associated therewith. The pair of strap securing areas are located on opposite sides of the first stack forming member.

A plurality of stack forming structures are stacked upon the first stack forming member. Thereafter, a last stack forming member is stacked on the plurality of stack forming structures which have been previously stacked on the first stack forming member. The last stack forming member has at least a pair of strap securing areas associated therewith. The pair of the strap securing areas of the last stack forming member are on opposite sides of that member.

A pressure is applied to form the first and the last stack forming members and the stack forming structures stacked therebetween into an assembly. Thereafter, holding straps are secured on opposite sides of the assembly to hold the assembly in an assembled condition. The holding straps are secured to and extend between the strap securing areas of the first and the last stack forming members. This securing operation is carried out while the assembly forming pressure is applied.

In accordance with preferred teachings of the method of this invention, the holding straps are normally mounted between opposite ends of the assembly and extend across the center of the assembly to join the first stack forming member and the last stack forming member at their strap securing areas.

In accordance with detailed teachings of a particular method of this invention, the first and the last stack forming members are U-shaped channel members and the stack forming structures are radiator forming structures. The first U-shaped channel is positioned in a stacking fixture with the legs of the U-shaped channel member in an inverted position to form a pair of strap securing areas on opposite sides of that member. In a similar manner, the last stack forming member is also a U-shaped channel member with its legs in an upstanding position to also form the strap securing areas of that last stack forming member. In this case, the assembly holding straps are stapled to the legs of the U-shaped channel members in order to assemble the members and radiator forming structures into an assembly.

BRIEF DESCRIPTION OF THE DRAWINGS

The novel features that are considered characteristic of the method of this invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is a diagrammatic illustration of the method of carrying out this invention, particularly when applied to the formation a radiator structure; and FIG. 2 is a cross-section view taken along line II—II of FIG. 1 showing in greater detail the structure which is achieved when a preferred embodiment of the method of this invention is applied to assembling a plurality of stackable components.

DESCRIPTION OF THE PREFERRED EMBODIMENT

The method of this invention may be used to assemble any stackable components. The preferred embodiment is, however, illustrated by assembly of components which ultimately form a radiator structure.

In accordance with the teachings of a preferred embodiment of the method of this invention, there is shown in the drawings a radiator structure, generally identified by the numeral 10. This radiator structure is formed from a plurality of fin structures 12—12 interleaved with a plurality relatively flat coolant flow tubes 14—14.

In a final construction, headers are formed on both ends of the radiator structure 10 for conducting coolant to the radiator structure and for removing the same. The coolant flows through the coolant flow tubes 14—14 and heat is dissipated therefrom by movement of cooling air over the corrugated fin structures 12'12 which are in mechanical contact with the coolant flow tubes whereby heat may be conducted therefrom.

In accordance with a preferred embodiment of the method of this invention, a radiator structure is assembled in the following manner. A first U-shaped channel member 16 having depending legs 18—18, best seen in FIG. 2, is placed in an inverted position with its legs 18—18 straddling a stacking fixture 20—20. The stacking fixture 20—20 has an open portion in the central part thereof. The stacking fixture also has associated therewith side guide elements 22—22 which guide the various components which are to be stacked into a proper relationship with one another. For example, the side guide elements 22—22 may contain a groove in which the ends of the various elements to be stacked are located to give precise alignment thereof in the fixture. The legs 18—18 of the U-shaped channel member 16 define a pair of strap securing areas on opposite sides of that member.

After the first U-shaped channel member 16 is placed in the stacking fixture 20—20, a plurality of radiator forming structures are stacked upon that first U-shaped channel member. In this case, the radiator forming structures are the aforementioned corrugated fin structures 12—12 and the coolant flow tubes 14—14. These elements are assembled one after the other.

After a sufficient number of the radiator forming structures have been stacked upon the first U-shaped channel member 16, then a last U-shaped channel member 24 having legs 26—26 is stacked upon the top of the radiator forming structures. The legs 26—26 of the last U-shaped channel member 24 define a pair of strap securing areas on opposite sides of the last U-shaped channel member. Thus, as is apparent from FIGS. 1 and 2, there would be a strap securing area on both the first U-shaped channel member 16 and the last U-shaped channel member 24 on the front and back sides of the radiator structure 10 as viewed in FIG. 1 and the right and left hand sides of the radiator structure as viewed in FIG. 2.

A predetermined load is placed on the radiator structure 10 by means of load applying devices 28—28. These load applying devices 28—28 act between the last U-shaped channel member 24 and the stacking fixture 20—20. A predetermined load is applied in order to bring the corrugated fin structures 12—12 into intimate contact on each side thereof with the associated coolant flow tubes 14—14 whereby a good mechanical contact is made therebetween which is needed in order to obtain good heat transfer from the coolant flow tubes to the corrugated fin structures.

It is precisely because a predetermined load is applied to form the radiator structure 10 that problems develop in construction of the structure. The exact height of the radiator structure 10 will be a variable because the different interleafed corrugated fin structures 12—12 and coolant flow tubes 14—14 do not always compress to the same degree because of the variability of the corrugated fin structures in crush resistance. Thus, one canot attribute a consistent fixed dimension to the height of the stacked radiator structure 10. The method of this invention has been designed particularly to compensate for a lack of a fixed admission when this assembly is made.

In accordance with the teachings of the method of the invention, while the radiator structure 10 is held in its assembled condition by means of the load applying devices 28—28 acting to place a predetermined pressure on the structure, the radiator structure 10 is secured into an assembly as follows. On each side of the assembly, an assembly holding strap 30—30 is, in the preferred embodiment, stapled by means of staples 32—32 to leg 18 of the first U-shaped channel member 16 and leg 26 of the last U-shaped channel member 24. In the preferred embodiment, the assembly holding strap 30 is located in the central position of the radiator structure 10 and extends generally perpendicularly upward from the first U-shaped channel member 16 to the last U-shaped channel member 24. It is, of course, within the scope of the teachings of this invention that the assembly holding strap can extend at an angular attitude between the first and last members and also that there can be one or more straps on both sides of the assembly.

In the preferred embodiment taught herein, a radiator structure 10 is disclosed as the assembly which is put together by the method of this invention. In this assembly, the first U-shaped channel member 16 and the last U-shaped channel member 24 are coated with a protective material so that in the corrosive environment to which such a structure is subjected in use in an automobile will not be detrimental to the members. That is the particular reason that the assembly holding straps 30—30 are stapled by means of staples 32—32 to the members 16 and 24. If they were to be spot welded, the coating material on the channel members 16 and 24 would boil away and would reduce or negate the possibility of forming a proper weld between the assembly holding straps 30—30 and the members 16 and 24. However, it is within the scope of this invention that in other assemblies where the elements are not coated with a protective material that one could use a spot welding operation to join the straps or any other type of bonding operation which provides a permanent securement of the assembly holding straps to the associated strap securing areas of the first stack forming member and the last stack forming member.

One would also have thought that one could use a U-shaped band which circled the first stack forming member and was secured after being pulled into position at its upper free ends to the last stack forming member. I, however, found that the bottom of such a U-shaped strap was quickly abraided by the first stack forming member and a good reliable assembly of the structure was not achieved. Thus, the method of this invention contemplates the use of at least a pair of assembly holding straps, one on each side of the assembly, in order to hold the same in an assembled condition.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of assembling a radiator structure which comprises the steps of:

stacking a first U-shaped channel member in a stacking fixture with the legs of said first U-shaped channel member being in an inverted position and forming a pair of strap securing areas on opposite sides of said first U-shaped channel member;

stacking a plurality of radiator forming structures upon said first U-shaped channel member;

stacking a last U-shaped channel member upon said plurality of radiator forming structures stacked on said first U-shaped channel member, the legs of said last U-shaped channel member being in an upstanding position and forming a pair of strap securing areas on opposite sides of said last U-shaped channel member;

applying pressure to form said first and said last U-shaped channel members and said radiator forming structure stacked therebetween into an assembly; and while said assembly forming pressure is still being applied, stapling an assembly holding strap on each side of said assembly, each of said assembly holding straps being stapled to and extending between said strap securing areas of said first and said last U-shaped channel members.

2. The method of claim 1, in which said holding straps are stapled to portions of said strap securing areas of said first and said last U-shaped channel members which are the least dimension from one another.

* * * * *